US005765895A

United States Patent [19]

Rose et al.

[11] Patent Number: 5,765,895

[45] Date of Patent: Jun. 16, 1998

[54] DOOR AND HOOD HINGE FOR MOTOR VEHICLES

[75] Inventors: Ariana Rose; Günter Plasberg, both of Remscheid, Germany

[73] Assignee: Ed. Scharwächter GmbH & Co. KG, Remscheid, Germany

[21] Appl. No.: 630,235

[22] Filed: Apr. 10, 1996

[30] Foreign Application Priority Data

Apr. 19, 1995 [DE] Germany ........................ 195 14 388.4

[51] Int. Cl.[6] ................................................ B62D 25/10

[52] U.S. Cl. ................................................ 296/76; 16/221

[58] Field of Search .................................. 296/76, 146.4, 296/97.22, 202; 16/221, 233, 235, 250, 273, 355, 356, 374

[56] References Cited

U.S. PATENT DOCUMENTS

| | | | |
|---|---|---|---|
| 3,330,593 | 7/1967 | Pollak | 296/76 |
| 3,643,755 | 2/1972 | Gionet et al. | 296/76 |
| 4,782,978 | 11/1988 | Appleby et al. | 296/97.22 |
| 4,811,984 | 3/1989 | Hempel | 296/202 |
| 5,029,930 | 7/1991 | Ikrke et al. | 296/76 |

*Primary Examiner*—Stephen Avila

*Attorney, Agent, or Firm*—Anderson Kill & Olick P.C.

[57] ABSTRACT

A door and hood hinge for a motor vehicle including a first hinge half attachable to a vehicle body, a second hinge half attachable to a door or a hood, and a hinge pin for connecting the first and second hinge halves for pivotal movement of the first and second halves relative to each other about a hinge axis, with the first hinge half being formed as a sheet shaped piece open at one end and obturating cut-out provided in the vehicle body part, and with the second hinge half being supported between opposite walls of the first hinge half by hinge pin studs forming the hinge pin.

9 Claims, 1 Drawing Sheet

DOOR AND HOOD HINGE FOR MOTOR VEHICLES

BACKGROUND OF THE INVENTION

The present invention relates to a door and hood hinge for motor vehicles including a first hinge half attachable to a vehicle body, a second hinge half attachable to a door or a hood, and a hinge pin for connecting the first and second hinge halves for pivotal movement of the first and second halves relative to each other about a hinge axis, with the first hinge half, which is attached to the vehicle body, being so arranged in a cut-out, which is closed by the one of a door and a hood and is provided in a body limiting part represented by one of a door pillar and a body girder, that the hinge axis is sunk-in relative to a contour of a profile of the cut-out. Door or hood hinges for motor vehicles a hinge half of which in sunk-in relative to the profile contour of the hinge-carrying body part, in particular of a body girder, are primarily used for the attachment of hoods or rear doors, for which a big pivot angle is required, to the vehicle body. In conventional construction, the body girder is provided with a recess or cut-out at the base of which the hinge half, which is associated with the vehicle body, is attached. This hinge half is usually formed as a sheet pressed piece or as a continuous elongate section of a hinge profile and is provided with corresponding connection tabs or the like. The other hinge half, which is associated with the door or the hood, is likewise formed of an elongate section of a hinge profile. For the connection of the two hinge halves for pivotal movement relative to each other, a hinge pin, which extends through both hinge halves, is used. The hinge pin is usually a mass produced part. Such a conventional hinge requires, on one hand, a formation of a body girder having a relatively complicated profile and, on the other hand, the use a particular rigid or reinforced metal sheet. This substantially increases the costs of attaching a hinge to the vehicle girder.

Accordingly, an object of the invention is a door and hood hinge of the above-described type which would be less costly in manufacturing and which would be more easily attachable to a vehicle body.

Another object of the invention is a hinge with which the vehicle body profile, which borders the door or the hood can be simplified without adversely affecting the water tightness of the vehicle body.

SUMMARY OF THE INVENTION

These and other objects of the invention, which will become apparent hereinafter, are achieved by forming a hinge half, which is associated with the vehicle body, as a sheet shaped piece open at one end and obturating the cut-out, with the second hinge half being supported between opposite walls of the first hinge half by hinge pin studs forming the hinge pin.

Forming the hinge half, which is associated with the vehicle body, as a wall section of a respective vehicle body part facilitate the attachment of this hinge half to the vehicle body and permits to avoid the use of additional auxiliary means. Furthermore, the hinge according to the present invention permits to avoid forming the hinge half, which is associated with the vehicle body, from a stiff or rigid metal sheet, which reduces the costs of manufacturing and attachment of this hinge half. In addition, the use of a hinge half, which is associated with the vehicle body and which is made according to the present invention, permits to simplify the formation of the corresponding part or section of the vehicle body itself, as the door pillar, bordering the door, or the body girder bordering the hood, can be formed with a simple cut-out instead of being formed with a complicated profile obtained by drawing which is characteristic for a respective part of the door pillar or the body girder when a conventional hinge is used. This is possible because the sheet shaped piece, which forms the hinge half associated with the vehicle body, is water-proof and, advantageously, is attached to the wall of the door pillar or the body girder by welding, in particular, spot welding. The manufacturing of this hinge half is also substantially facilitated because it is formed as a single sheet shaped piece.

In accordance with a preferred embodiment of the invention, the sheet shaped piece, which forms the hinge half associated with the vehicle body, is pot-shaped, which insures its water-proof properties, and has, along the edge of its opening, a rim aligned with the profile contour of the body part, in which the hinge half is received, i.e., of the door pillar or the body girder. Thereby, the pot-shaped piece can be sealingly, i.e., in a water-proof manner, attached to the wall of the corresponding body part. Further, the rim which extends along the entire perimeter of the pot-shaped part and forms a connection flange can be attached to the adjoining surface region of the body part, i.e., of the door pillar or the body grinder, by spot welding or similarly suitable seam-forming technique. This further improves the water-proof properties of the connection, together with the improved strength of the connection.

The sheet shaped piece, which forms the hinge half associated with the vehicle body, advantageously has over its depth generally a rectangular cross-section with opposite vertical side walls, which form the second hinge half support, extending transverse to the hinge axis, and substantially horizontal, extending parallel to the hinge axis, transverse upper and lower walls. The transition regions, which connect the vertical side walls with the horizontal transverse walls and with the bottom wall of the pot-shaped piece, have a relatively big radius.

According to a further embodiment of the invention, one of the horizontal transverse walls, in particular the wall, which is more closely to the hinge axis, is inclined toward the opposite transverse wall in a direction starting from the bottom wall toward the piece opening. In particular, the inclined transverse wall can be so inclined toward the opposite transverse wall that the pot-shaped piece assumes an undercut cross-sectional shape.

With the hinge half, which is associated with the vehicle body, being formed as a pot-shaped piece, a big pivot or opening angle of the door or hood can be achieved when the other hinge half, which is associated with the door or the hood, is formed of a profiled material section and is bent as a hinge arm so that the other hinge half, starting from the hinge axis and up to the opposite stop end, is a V- or U-shaped.

According to a further development of the invention, it is provided that the other hinge half in supported in the hinge half, which is associated with the vehicle body, by two hinge pin studs that extend through the opposite side walls of the first hinge half. The two hinge pin studs define the hinge axis. The two hinge pin studs have portions which sealingly abut inner and outer surfaces of respective side walls.

A particular effective and relatively simple way of water-proof closing of the openings for the two hinge pin studs is achieved when the two hinge pin studs are formed as blind rivets. At that, the used blind rivets are of a type having an expansion portion such that, in accordance with the rivet setting, in the course of riveting, the expansion portion sealingly abuts the inner surface of the side wall which is opposite to the outer surface of the side wall which is abutted by the rivet head. Such blind rivets permit to insert the hinge pin studs in a single operational step, without any auxiliary means, such as sealing washers or the like. These rivets insure an easy assembly of the hinge and an absolute waterproofing of the holes through which the hinge pin studs extend. A further advantage of the blind rivets consist in that the hinge support can be made maintenance-free by forming the gudgeon of the other hinge half with a bearing sleeve formed of a maintenance-free material.

According to a still further development of the present invention, the hinge, which is formed of two spaced hinge halves with the opposite spacings between the halves being bridged by a web, can be formed as one piece made of a uniform material section. Such a hinge forms an essential part of a door pillar wall or the body girder wall.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENT

Figure 2:
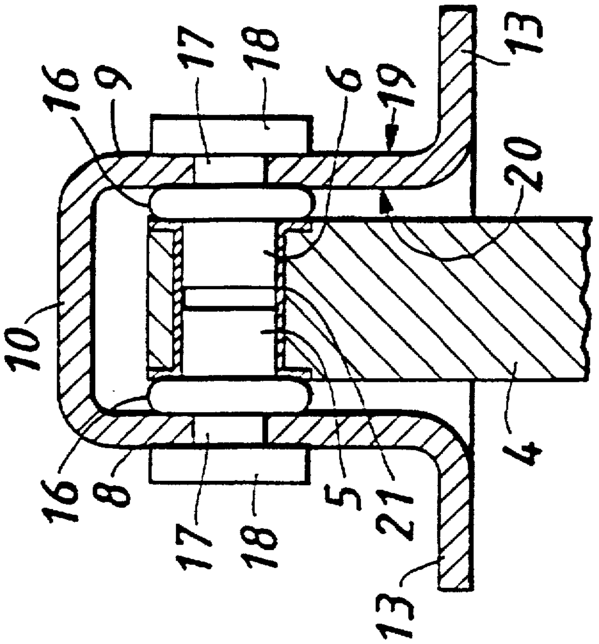
FIG. 2 shows a cross-sectional view of a connection of two hinge halves.
Figure 1:
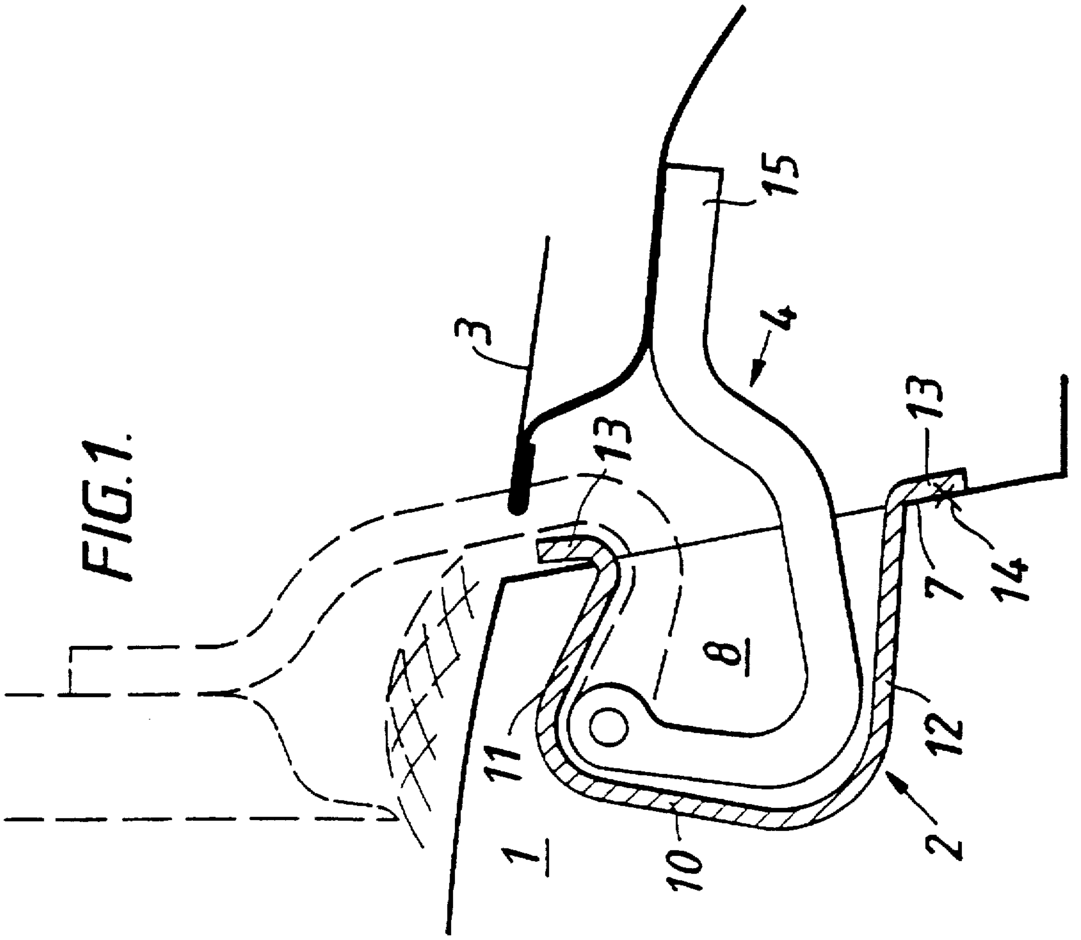
FIG. 1 shows a cross-sectional view of a connection of a hood to a vehicle body which is formed with a hinge according to the present invention.

A hood hinge for motor vehicles according to the present invention, which is shown in the drawings, includes of a first hinge half 2 attached to a vehicle body girder 1 which limits the hinge cut-out, and a second hinge half 4 attached to the hood 3. The two hinge halves 2 and 4 are pivotally connected with each other by hinge pin studs 5 and 6. The first hinge half 2 is formed as a sheet shaped piece open at one side. The first hinge half 2 closes the cut-out 7 in the body girder 1. The other hinge half 4 is formed by an elongate section of a suitable hinge profile. The sheet shaped piece, which forms the first hinge half 2, has a pot-like shape and has two side walls 8 and 9 which extend substantially vertically, i.e., transverse to the hinge axis. The two side walls 8 and 9 of the pot-shaped first hinge half 2 adjoin, on one hand, a bottom wall 10 and, on the other hand, upper and lower transverse walls 11 and 12 which extend parallel to the hinge axis. The transition wall portion between the adjoining each other walls 8 and 12 has relatively large radius.

The first hinge half 2 has, at its open end, outwardly projecting rim 13 which is aligned with the body girder 1 and which forms a connection flange. The sheet shaped piece, which forms the first hinge half 2, is connected to the adjoining wall of the body girder 1 along the outwardly projecting rim 13 by spot welding 14. The connection between the rim 13 and the adjoining wall of the body girder 1 is water-proof. The upper transverse wall 11, which extends from the bottom wall 10 to the rim 13 is inclined toward the oppositely located lower transverse wall 13.

The second hinge half 4, which is formed, as it has already been mentioned previously, by an elongate section of an appropriate hinge profile, is cumbered transverse to the hinge axis forming a hinge arm. The second hinge half 4 is, starting from the hinge axis and toward its stop end 15, somewhat V- or U-shaped. The hinge pin studs 5 and 6, which connect the second hinge half 4 with the first hinge half 2, are formed as blind rivets. The blind rivets, which form the hinge pin studs 5 and 6, have an expansion portion 16 that supports a pin portion 17 and adjoins an inner surface 20 of the respective wall 8 or 9. The pin portion 17 extends through a hole formed in the respective wall 8 or 9 of the first hinge half 2 and ends with a rivet head 18 that abuts the outer wall 19 of the respective wall 8 or 9. Upon mounting of the blind rivets, the expansion portions 16 and the rivet heads 18 are pressed against the inner surfaces 20 and the outer surfaces 21 of the respective walls 8 and 9 whereby an absolute water-proof connection of the first hinge half is provided. The second hinge half 4 is supported on the hinge pin studs 5 and 6, as shown in FIG. 2, by a bearing sleeve 21 formed of a maintenance-free bearing material.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope the appended claims.

What is claimed is:

1. A door and hood hinge for a motor vehicle comprising:

a first hinge half attachable to a vehicle body;

a second hinge half attachable to one of a door and a hood; and a hinge pin for connecting the first and second hinge halves for pivotal movement of the first and second halves relative to each other about a hinge axis;

wherein the first hinge half, which is attached to the vehicle body, is so arranged in a cut-out, which is closed by the one of a door and a hood and is provided in a body limiting part represented by one of a door pillar and a body girder, that the hinge axis is sunk-in relative to a profile of the cut-out, wherein the first hinge half is formed as a sheet-shaped piece open at one end and obturating the cut-out, and the second hinge half is supported between opposite walls of the first hinge half by hinge pin studs forming the hinge pin, and wherein the sheet-shaped piece, which forms the first hinge half, has a fluid-proof pot shape and forms a fluid-proof connection with the vehicle body part, the pot-shaped piece having a bottom and at least one side extending from the pot-shaped piece bottom and tapering in a direction of a pot-shaped piece opening.

2. A hinge as set forth in claim 1, wherein the pot-shaped piece, which forms the first hinge half, has a substantially rectangular cross-sectional shape and has two spaced, substantially vertical side walls, which extends transverse to the hinge axis and which define the opposite walls of the first hinge half between which the second hinge half is supported, the pot-shaped piece further including two horizontal transverse walls extending parallel to the hinge axis.

3. A hinge as set forth in claim 1, wherein the pot-shaped piece has, along an open side thereof, an extending rim which forms a connection flange for attaching the first hinge half to the vehicle body.

4. A hinge as set forth in claim 1, wherein the second hinge half is formed as a profiled section and is bent in such a way that, starting from the hinge axis and up to a stop end of the second hinge part, it has one of V-shaped profile and U-shaped profile.

5. A hinge as set forth in claim 2, wherein the hinge pin studs comprise two hinge pin studs extending through openings provided in the two vertical side walls.

6. A hinge as set forth in claim 5, wherein the two hinge pin studs, which define the hinge axis, sealingly abut, respectively, inner and outer surfaces of respective vertical side walls.

7. A hinge as set forth in claim 6, wherein each hinge pin stud is formed as a blind rivet having an expansion portion that sealingly abuts the inner surface of a respective vertical side wall.

8. A hinge as set forth in claim 1, wherein the second hinge half has a gudgeon formed as a bearing sleeve from a maintenance-free bearing material.

9. A hinge as set forth in claim 1, wherein the first and second hinge parts, which are spaced from each other, are formed, together with web means which bridges spacing therebetween, as one piece from a uniform material section, the hinge forming as essential element of a wall of the one of the door pillar and the body girder.

* * * * *